(12) United States Patent
Miura

(10) Patent No.: US 8,024,516 B2
(45) Date of Patent: Sep. 20, 2011

(54) STORAGE APPARATUS AND DATA MANAGEMENT METHOD IN THE STORAGE APPARATUS

(75) Inventor: Sumihiro Miura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 791 days.

(21) Appl. No.: 12/010,850

(22) Filed: Jan. 30, 2008

(65) Prior Publication Data
US 2009/0077312 A1 Mar. 19, 2009

(30) Foreign Application Priority Data

Sep. 19, 2007 (JP) .................................. 2007-242840

(51) Int. Cl.
*G06F 12/00* (2006.01)
(52) U.S. Cl. ................. 711/113; 711/112; 711/E12.019
(58) Field of Classification Search .................. None
See application file for complete search history.

(56) References Cited

U.S. PATENT DOCUMENTS

| 5,586,291 | A  | * | 12/1996 | Lasker et al. | ................. 711/113 |
| 5,860,083 | A  |   | 1/1999  | Sukegawa |  |
| 6,243,795 | B1 | * | 6/2001  | Yang et al. | .................... 711/159 |
| 6,295,577 | B1 | * | 9/2001  | Anderson et al. | ............. 711/113 |
| 6,327,671 | B1 | * | 12/2001 | Menon | ............................. 714/6 |

FOREIGN PATENT DOCUMENTS

| JP | 06-236241 | 2/1993 |
| JP | 10-154101 | 11/1996 |

* cited by examiner

*Primary Examiner* — Reginald Bragdon
*Assistant Examiner* — Thanh D Vo
(74) *Attorney, Agent, or Firm* — Volpe and Koenig, P.C.

(57) ABSTRACT

A storage apparatus sets up part of non-volatile cache memory as a cache-resident area, and in an emergency such as an unexpected power shutdown, backs up dirty data of data cached in volatile memory to an area other than the cache-resident area in the non-volatile cache memory, together with the relevant cache management information. Further, the storage apparatus monitors the amount of the dirty data in the volatile cache memory so that the dirty data cached in the volatile cache memory is reliably contained in a backup area in the non-volatile memory, and when the dirty data amount exceeds a predetermined threshold value, the storage apparatus releases the cache-resident area to serve as the backup area.

12 Claims, 17 Drawing Sheets

FIG.5

| LEADING LOGICAL ADDRESS | CACHE MEMORY LEADING ADDRESS | DIRTY STATUS |
|---|---|---|
| ⋮ | ⋮ | ⋮ |
| 1000 | 0100 | 0 |
| 1100 | 0200 | 1 |
| 1200 | 0300 | 1 |
| 1300 | 8100 | 0 |
| 1400 | 8200 | 1 |
| ⋮ | ⋮ | ⋮ |

FIG.6

| CM # | RESIDENT SETTING STATUS | DIRTY DATA AMOUNT THRESHOLD VALUE | RESIDENT AREA LEADING ADDRESS | RESIDENT AREA ENDING ADDRESS | RESIDENT AREA SIZE |
|---|---|---|---|---|---|
| VCM #0 | 0 | F000 | - | - | - |
| NVCM #0 | 1 | - | F000 | FFFF | 0FFF |
| VCM #1 | 0 | F000 | - | - | - |
| NVCM #1 | 1 | - | F000 | FFFF | 0FFF |
| VCM #2 | 0 | F000 | - | - | - |
| NVCM #2 | 1 | - | F000 | FFFF | 0FFF |
| VCM #3 | 0 | F000 | - | - | - |
| NVCM #3 | 0 | - | - | - | - |

601, 602, 603, 604, 605, 606, 600

SETTING ADMISSIBILITY CONDITION: DIRTY DATA AMOUNT THRESHOLD VALUE
< CAPACITY OF NVCM ·CACHE-RESIDENT AREA SIZE >

FIG.12

| VCM LEADING LOGICAL ADDRESS | NVCM LEADING ADDRESS |
|---|---|
| : | : |
| x200 | y100 |
| x300 | y200 |
| x500 | y300 |
| x900 | y400 |
| : | : |

STORAGE APPARATUS AND DATA MANAGEMENT METHOD IN THE STORAGE APPARATUS

CROSS-REFERENCES TO RELATED APPLICATIONS

This application relates to and claims priority from Japanese Patent Application No. 2007-242840, filed on Sep. 19, 2007, the entire disclosure of which is incorporated herein by reference.

BACKGROUND

1. Field of the Invention

The invention relates to a storage apparatus and a method of managing data in the storage apparatus, and particularly relates to a backup technique for cache data in the storage apparatus.

2. Description of Related Art

With the viewpoint of improving system performance, etc., a storage apparatus (or storage sub-system) is generally equipped with cache memory. The cache memory is typically composed of volatile memory such as DRAM. A large-scale storage apparatus equipped with high-capacity hard disk drives (HDD) is provided with high-capacity cache memory in the order of from several to several tens of gigabytes. During operation, the storage apparatus responds to an I/O request to a host apparatus while caching application data in the cache memory.

Also, in order to further improve system performance, a storage apparatus has been proposed which includes a "cache-resident function" for caching the entire logical volume created for hard disk drives in cache memory.

In such a storage apparatus, in order to prevent large amounts of data in cache memory from disappearing, upon an unexpected power shutdown, data in the cache memory is destaged (backed up) to hard disk drives while power supply is temporarily supplied from a battery as a secondary power supply to maintain the operation state of the apparatus.

In addition, increased capacity and reduction in cost of non-volatile memory such as flash memory have been promoted recently, and application of non-volatile memory has been expanding rapidly. For example, JP06-236241 A discloses a hard disk device in which part of cache memory is composed of flash memory. More specifically, in JP06-236241 A, data in a frequently accessed area in a hard disk is located in flash memory, and this eliminates the movement of a disk head as much as possible to enhance data access efficiency, and also prevents cache data from disappearing due to a power shutdown.

Further, JP10-154101 A discloses a data storage system in which a semiconductor disk apparatus composed of EEPROM functions as cache memory to a hard disk device. Specifically, in JP10-154101 A, necessary information for activating an operating system or a frequently-used application program is stored in the semiconductor disk apparatus, and this enables the cache function to be exhibited effectively even immediately after the power-on.

In a large-scale storage apparatus, large amounts of data exist in cache memory while not being subjected to destaging to hard disk drives during operation. Therefore, it is imperative to take measures to prevent such data from disappearing in an emergency such as a power shutdown.

A conventional battery-employing backup method in an emergency has tended to prove costly, as a storage apparatus needs to be provided with a considerable number of relatively expensive batteries in order to maintain its driving of hard disk drives. Therefore, keeping power consumption low as much as possible leads to longer driving with a smaller number of batteries. However, as long as a hard disk drive is set as a data backup destination, there is a limit to effective reduction in power consumption.

Further, if backup is conducted for all the data in cache memory in an emergency such as a power shutdown, the load on a processor as a result of backup processing will be heavy, and backup time is required. Thus, it has been difficult to keep battery power consumption low.

Moreover, even when part of cache memory is composed of non-volatile memory, the data stored in volatile memory still has a problem in that the data will be lost without being subjected to backup in an emergency such as a power shutdown. However, if the data stored in volatile cache memory is backed up to a hard disk drive in an emergency such as a power shutdown, this eventually results in the power consumption problem in the conventional battery backup method. Despite this, backup for cache data in volatile memory to non-volatile memory used as cache memory has not been proposed.

Furthermore, when non-volatile cache memory is used as backup memory in an emergency such as a power shutdown, when data in volatile cache memory is merely transferred to the non-volatile cache memory, data that does not originally need to be subjected to backup, such as clean data, is transferred also, which means effective backup processing cannot be realized. There is also the possibility that as of yet non-destaged data cached in the non-volatile cache memory is overwritten with the transferred data.

In view of the above, the invention has an objective of data held in volatile cache memory being efficiently and reliably stored under a second power supply even when an emergency backup request due to an unexpected power shutdown or similar emerges, and consequently has an objective of reducing the power consumption of the secondary power supply as much as possible.

SUMMARY

The present invention has been made in view of the above, and an object of the invention is to propose a storage apparatus that utilizes non-volatile memory as cache memory and that also efficiently backs up data in a volatile cache memory to the non-volatile memory when a backup request emerges.

Another object of the invention is to propose a storage apparatus that utilizes a part of a non-volatile cache memory as a cache-resident area and that also efficiently backs up data in a volatile cache memory to an area (backup area) other than the cache-resident area.

Still another object of the invention is to propose a storage apparatus that adjust the data amount that resides in a non-volatile cache memory in order to reliably store data in volatile cache memory in a backup area in the non-volatile cache memory.

The invention has been made in order to attain the above objects, and includes the following technical features. More specifically, according to an aspect of the invention, provided is a storage apparatus including a disk device formed with plural logical volumes for storing a plurality of datasets and a disk controller configured to control the disk device. The disk controller includes: a host interface that receives an access request from a host apparatus; a disk interface connected to the disk device; and a cache memory unit that is connected to the host interface and the disk interface and that includes volatile cache memory and non-volatile cache memory. The disk controller has a first dataset stored in a first logical volume in the disk device resident in a cache-resident area formed in the non-volatile cache memory. The host interface, for each receipt of a write request from the host apparatus, writes a second dataset in response to the write request to a predetermined area in the volatile cache memory, and sets a dirty attribute in cache management information for the written second data set to on. When the second dataset written to the predetermined area in the volatile cache memory is destaged to a second logical volume in the disk device, the disk interface sets the dirty attribute in the cache management information for the destaged second data set to 'off.' Also, the disk controller, at the time of a predetermined backup request, transfers the second dataset for which the dirty attribute is 'on,' from among a group of the second datasets that have been written to the volatile cache memory, to the non-volatile cache memory, and writes the second dataset to an area other then the cache-resident area.

The invention can also be recognized as a method invention. More specifically, according to an aspect of the invention, provided is a method of backing up data in a storage apparatus including a disk device formed with plural logical volumes for storing a group of data sets and a disk controller configured to control the disk device. The method includes: having, under the control of the disk controller, a first dataset stored in a first logical volume in the disk device resident in a cache-resident area formed in non-volatile cache memory; writing, under the control of the disk controller, for each receipt of a write request from a host apparatus, a second dataset in accordance with the write request to a predetermined area in volatile cache memory and setting a dirty attribute for cache management information for the written second data set to 'on;' at the time the second data set written to the predetermined area in the volatile cache memory is destaged to a second logical volume in the disk device, setting, under the control of the disk controller, the dirty attribute in the cache management information for the destaged second data set to 'off;' and at the time of a predetermined backup request, transferring, under the control of the disk controller, the second data set for which the dirty attribute is on, from among a group of the second datasets that have been written to the volatile cache memory, to the non-volatile cache memory.

Moreover, the invention can be recognized as a program-related invention that causes a storage apparatus to realizes predetermined functions.

According to the invention, the data held in volatile cache memory is efficiently and reliably stored under a second power supply even when an emergency backup request due to an unexpected power shutdown or similar emerges, preventing the data from disappearing, and consequently, reducing power consumption of the secondary power supply c.

BRIEF DESCRIPTION OF THE DRAWINGS

FIG. 5 is a diagram showing an example of a cache management table held in shared memory in a storage apparatus in accordance with an embodiment of the invention.

FIG. 6 is a diagram showing an example of an internal table held in local memory in a storage apparatus in accordance with an embodiment of the invention.

FIG. 12 is a diagram showing an example of an address mapping table in a storage apparatus in accordance with an embodiment of the invention.

DETAILED DESCRIPTION OF PREFERRED EMBODIMENTS

An embodiment of the present invention will be described below with reference to the accompanying drawings.

In this embodiment, a part of a non-volatile cache memory in a storage apparatus is set as a cache-resident area, and in an emergency such as an unexpected power shutdown, "dirty" data of data cached in a volatile memory is transferred to an area (backup area) other than the cache-resident area in the non-volatile cache memory, together with the relevant metadata (cache management information). Also in this embodiment, so that the dirty data cached in the volatile cache memory is reliably contained in the backup area in the non-volatile memory, the amount of the dirty data cached in the volatile cache memory is monitored, and when the dirty data amount exceeds a predetermined threshold value, all or a part of the cache-resident area is released to serve as the backup area.

Dirty data means data cached in a cache memory that is not consistent (not in accord) with the corresponding data stored in a hard disk device. Typically, when data in a cache memory is updated in response to a write request from a host apparatus, but the corresponding data in a hard disk device has not been updated yet, the data in the cache memory is in a dirty status. In contrast, clear data means data cached in a cache memory that is consistent with the corresponding data stored in a hard disk device.

When an emergency backup request occurs due to an unexpected power shutdown or similar, the storage apparatus immediately backs up the dirty data cached in the volatile cache memory and the relevant cache management information to the backup area in the non-volatile cache memory. Further, where the storage apparatus is provided with a shared memory composed of volatile memory, the storage apparatus similarly backs up various kinds of information stored in the shared memory to the backup area in the non-volatile cache memory.

By way of this configuration, in an emergency such as a power shutdown, only data specified from among the data in the volatile cache memory needs to be backed up. This enables high-speed execution of backup with less power consumption.

Figure 1:
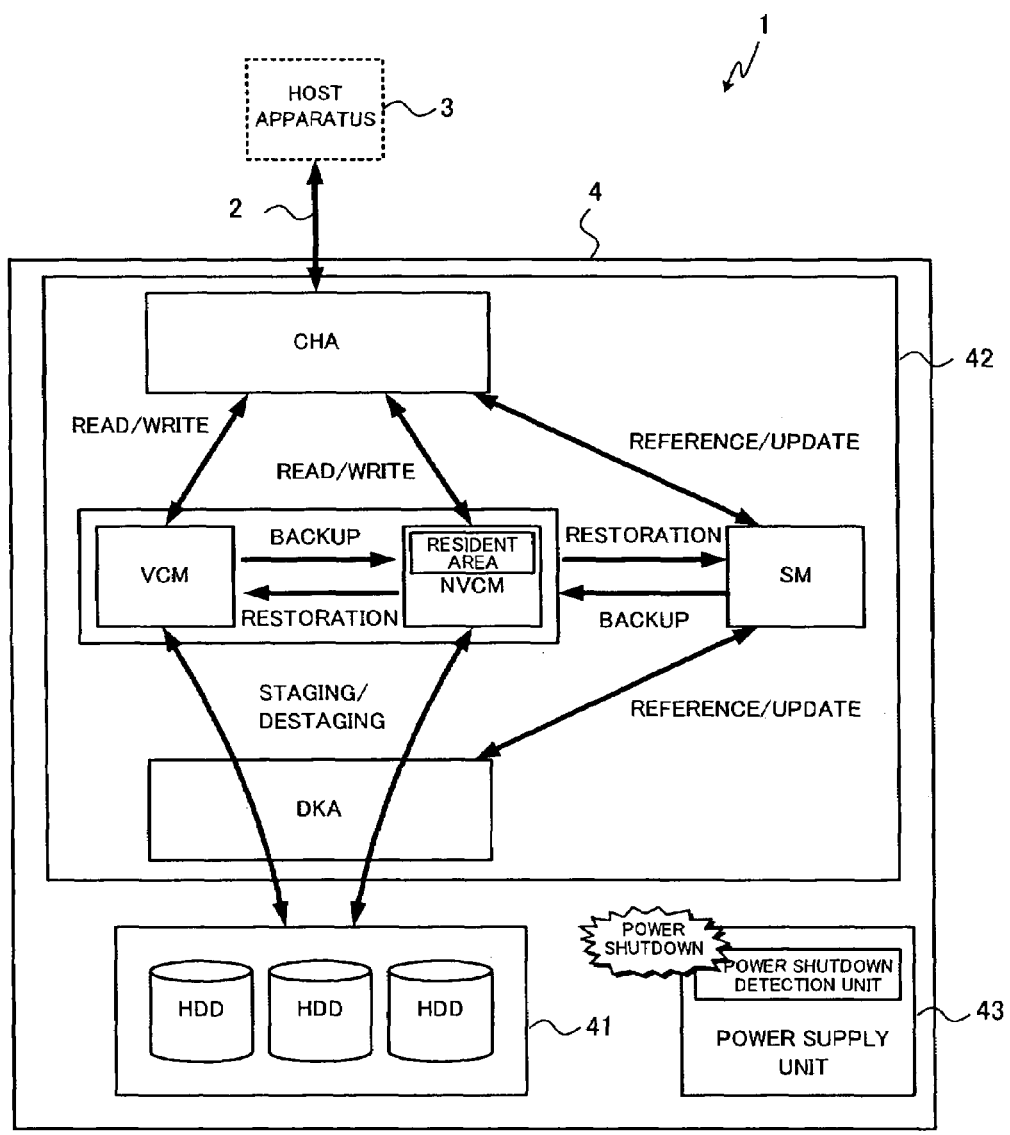
FIG. 1 is a conceptual diagram explaining a data backup/restoration mechanism in a storage apparatus in accordance with an embodiment of the invention.

FIG. 1 is a conceptual diagram explaining a data backup/restoration mechanism in a storage apparatus in accordance with an embodiment of the invention.

As shown in FIG. 1, a storage apparatus 4 is connected to a host apparatus 3 via a channel 2, thereby forming a computer system 1.

The storage apparatus 4 is provided with a disk device 41 composed of hard disk drives (HDD) or similar, a disk controller (DKC) 42 that controls I/O processing to the disk device 41, and a power supply unit 43 that supplies power necessary for the above components.

The disk controller 42 is typically provided with a channel adapter CHA, a cache memory CM, a disk adapter DKA, and a shared memory SM. In this embodiment, the cache memory CM is configured to include a volatile cache memory VCM composed of DRAM and a non-volatile cache memory NVCM composed of flash memory. Also, the shared memory SM is composed of DRAM. The components in the disk controller 42, under the control of a not-shown processor, mutually cooperate to respond to an access request from the host apparatus 3, and store application data in the disk device 41 or read the application data from the disk device 41 to provide the data to the host apparatus 3. An example of a detailed configuration and operation for the storage apparatus 4 will be described later.

The volatile cache memory VCM is used as conventional cache memory. The non-volatile cache memory NVCM is used as cache memory that provides a cache-resident area via a cache-resident function. The cache-resident function is a function with which all or part of the data in a specific logical volume is made to reside in a cache memory. The area where data is resident in a cache memory is referred to as a cache-resident area. Upon receiving an access request to a specific logical volume, the processor controls the channel adapter CHA so that processing is executed with the request serving as an access request to the cache-resident area.

More specifically, the channel adapter CHA stores a command according to the access request from the host apparatus 3 in the shared memory SM, and the processor interprets the command. As a result, if the processor determines that the access request is access for the cache-resident area, the processor controls the channel adapter CHA to have it access the cache-resident area in the non-volatile cache memory NVCM. On the other hand, as a result, if the processor determines that the access request is not access for the cache-resident area, the processor controls the channel adapter CHA to have it access the volatile cache memory VCM.

More specifically, in the case of a read request, if the required data does not exist in the volatile cache memory VCM (in the case of a cache error), the disk adapter DKA refers to the shared memory SM, reads the request data from the disk device 41, writes the data to the volatile cache memory VCM (staging), and updates cache management information in the shared memory SM. In the case of a write request, the channel adapter CHA writes the required data to the volatile cache memory VCM, and updates the cache management information in the shared memory SM. In this case, the data written to the volatile cache memory VCM remains in a dirty status unless the data is destaged to the disk device 41 by the disk adapter DKA.

During operation of the storage apparatus 4, e.g., when an unexpected power shutdown or similar occurs, the storage apparatus 4 backs up the data written to the volatile cache memory VCM to the non-volatile cache memory NVCM under the power supply of a secondary power source in order to prevent the data from disappearing. In this case, an address mapping table is created in which the position (address) in the volatile cache memory VCM and the position (address) in the non-volatile cache memory for the backup data are associated with each other. Backup is executed by, e.g., a cache memory controller (not shown in the drawing) that controls the cache memory. The data to be subjected to backup is not all the data stored in the volatile cache memory VCM but dirty data and the relevant cache management information stored in the shared memory SM. The storage apparatus 4 also backs up system configuration information, etc. held in the shared memory SM to the non-volatile cache memory NVCM.

When the power shutdown or similar is recovered, the storage apparatus 4 restores the data and the relevant cache management information that were backed up to the non-volatile cache memory NVCM to the respective original positions in the volatile cache memory VCM and the shared memory SM. Accordingly, the storage apparatus 4 can immediately provide the host apparatus 3 with data storage ability starting with the data as of at the time the power shutdown or similar occurred.

Figure 2:
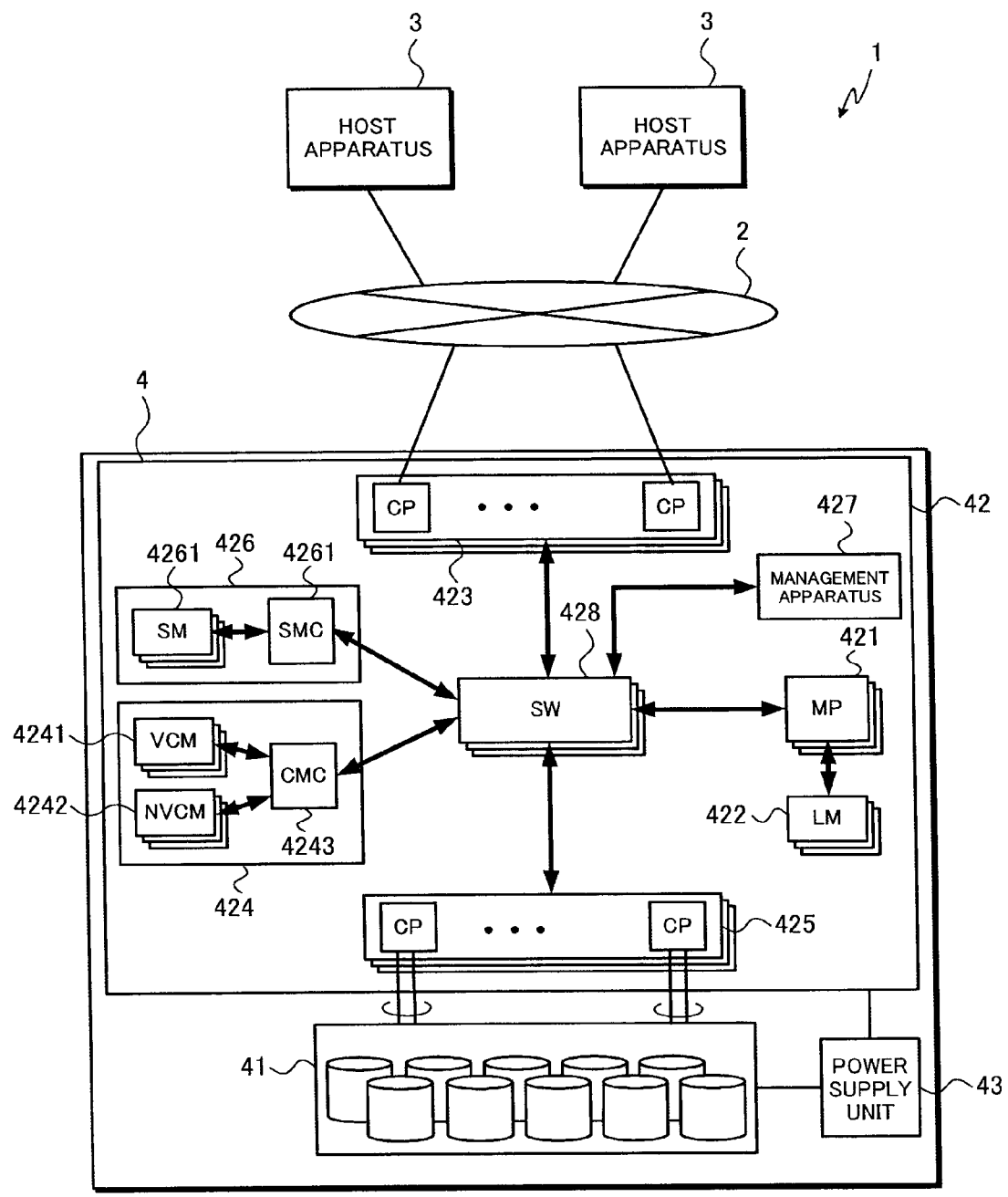
FIG. 2 is a diagram explaining a configuration for a computer system including a storage apparatus in accordance with an embodiment of the invention.

FIG. 2 is a diagram explaining a configuration for the computer system 1 including the storage apparatus 4 in accordance with the embodiment of the invention. Referring to FIG. 2, the computer system 1 includes the host apparatuses 3 and the storage apparatus 4 that are connected to each other via the channel 2, and is configured as, e.g, a bank operation system or an airline reservation operation system.

The channel 2 is composed of, e.g., an LAN, the Internet, or an SAN (storage area network), and is configured to include a network switch, a hub, and the like. In this embodiment, the channel 2 is composed of an SAN (FC-SAN) using Fiber Channel Protocol.

The host apparatus 3 is a computer that constitutes the core of, e.g., the bank operation system or the airline reservation operation system. Specifically, the host apparatus 3 is provided with hardware resources such as a processor, a main memory, a communication interface, and a local input/output device and software resources such as device drivers, an operating system (OS), and an application program (not shown in the drawing). Therefore, the host apparatus 3, under the control of a processor, executes various programs to realize desired processing in cooperation with the hardware resources. For example, the host apparatus 3, under the control of the processor, executes an operation application program in OS to access the storage apparatus 4, which will be described in detail, thereby realizing a desired operation system.

The storage apparatus 4 is an auxiliary storage apparatus that provides the host apparatus 3 with data storage ability. The storage apparatus 4 is provided with the disk device 41 includes physical devices (PDEV), the disk controller 42 that controls I/O processing including write/read to/from the disk device 41, and the power supply unit 43 that supplies power necessary for the above components.

Figure 3:
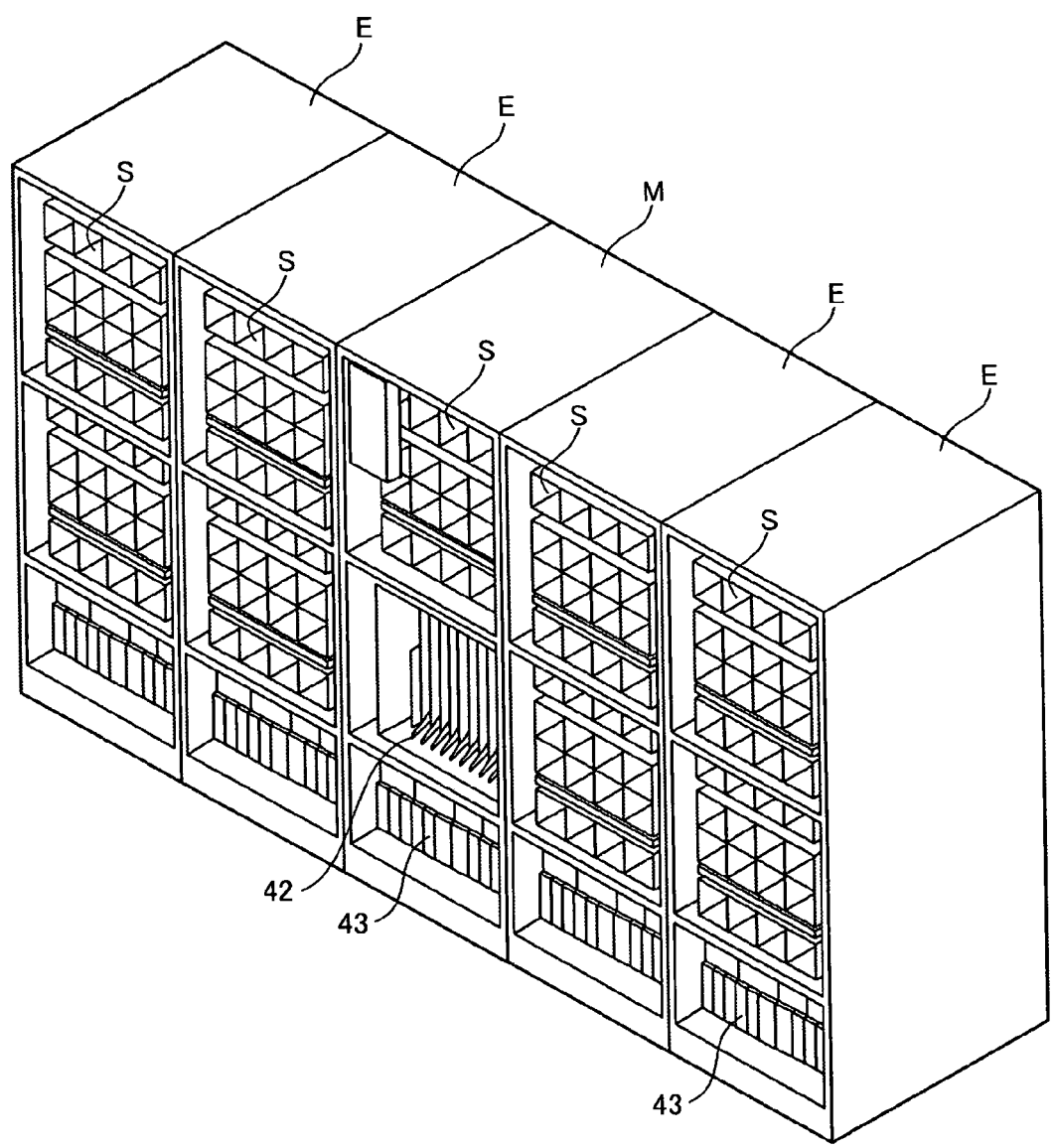
FIG. 3 is a diagram showing a configuration for an appearance of a storage apparatus in accordance with an embodiment of the invention.

FIG. 3 is a diagram showing a configuration for appearance of the storage apparatus 4 in accordance with the embodiment of the invention. As shown in FIG. 3, the storage apparatus 4 in the embodiment comprises a main unit M and expansion units E for expanding the disk device 41. The main unit M includes the disk device 41 and the disk controller 42. In this example, not the disk device 41 but slots S into which the HDDs are fitted are shown. The power supply unit 43 including a secondary power source is disposed below each of the main unit M and the expansion units E. Also, the main unit M includes a management apparatus (not shown in the drawing), so that a system administrator can manage the storage apparatus 4.

Returning to FIG. 2, the disk device 41 is configured to include storage media such as plural hard disk drives (HDD). The disk device 41 can form a RAID group that serves as a virtual device (VDEV) using a RAID (Redundant Arrays of Independent Disks) technique. One or more logical devices (LDEV) are defined in a virtual device.

A logical unit (LU) may be assigned to serve as a logical device. Both the logical device and the logical unit are logical storage devices recognizable by the host apparatus 3. Both the logical device and the logical unit are distinguishable based on a system environment in which the storage apparatus 4 is utilized, but may be treated as having the same meaning in this specification. Each logical unit is given a logical unit number (LUN). Also, the logical unit is divided into blocks that are the minimum units for I/O access, and a logical block address (LBA) is assigned to each block. Therefore, the host apparatus 3 gives the storage apparatus 4 with a logical address composed of the LUN and LBA, and as a result, accessing the data stored in an arbitrary block in a specific logical unit is realized.

The disk controller 42 is provided with microprocessors (MP) 421, a local memories (LM) 422, channel adapters (CHA) 423, a cache memory (CM) unit 424, disk adapters (DKA) 425, a shared memory (SM) unit 426, and a management apparatus 427. These components are connected to one another via internal switches (SW) 428. In this embodiment, the components each have been multiplexed.

Each microprocessor 421 executes a control program held in the local memory 422 that functions as main memory, thereby exercising control over the disk controller 42. Each local memory 422 stores an internal table that manages a cache-resident function in the storage apparatus 4. The internal table will be described later with reference to FIG. 6.

Each channel adapter 423 is a host interface that is provided with channel protocol devices (CP) corresponding to ports (not shown in the drawing) and that communicates in response to an access request with the host apparatuses 3 connected to the ports via the channel 2. Each channel protocol device is provided with a processor for executing protocol processing in accordance with individual protocols.

The cache memory unit 424 is a memory that temporarily stores (caches) the data transferred between the host apparatus 3 and the disk device 41 in order to provide the host apparatus 3 with high response performance. In other words, the cache memory unit 424 is utilized for data transfer between the channel adapters 423 and the disk adapters 425. In this embodiment, the cache memory unit 424 is configured to include volatile cache memories 4241 composed of DRAMs and non-volatile cache memories 4242 composed of flash memories. The volatile cache memories 4241 and the non-volatile cache memories 4242 each have been multiplexed. Also, each volatile cache memory 4241 and each non-volatile cache memory 4242 have the same memory sizes. Note that, in this specification, when cache memory is simply indicated, the cache memory includes both the volatile cache memories 4241 and the non-volatile cache memories 4242.

The cache memory unit 424 is also provided with a cache memory controller (CMC) 4243. The cache memory controller 4243 performs data control over each volatile cache memory 4241 and each non-volatile cache memory 4242. Moreover, the cache memory controller 4243 executes backup/restoration processing described later under the instruction from the microprocessor 421.

In this embodiment, the volatile cache memory 4241 is used as normal cache memory. Meanwhile, the non-volatile cache memory 4242 is used as cache memory that provides a cache-resident area normally, and is used as backup memory for the volatile cache memory 4241 and the shared memory unit 426 in the event of an emergency such as a power shutdown.

More specifically, in normal operation, upon receiving a write request from the host apparatus 3, the channel adapter 423 writes data (i.e., write data) accordance to the write request to a predetermined area in the cache memory unit 424. In this case, if the write request is for access to a logical volume resident in the cache-resident area, the channel adapter 423 writes the write data in the corresponding block in the cache-resident area in the non-volatile cache memory 4242. Meanwhile, if the write request is not for access to a logical volume resident in the cache-resident area, the channel adapter 423 writes the write data in the corresponding block in the volatile cache memory 4241. Also, upon receiving a read request from the host apparatus 3, the channel adapter 423 reads required data from a predetermined block where the data exists in the cache memory unit 424, and sends the data to the host apparatus 3.

This embodiment presents a configuration in which the volatile memory 4241 and the non-volatile memory 4242 are included in one memory board, but may employ a configuration in which the volatile memory 4241 and the non-volatile memory 4242 are respectively included in memory boards physically independent from each other.

The disk adapter 425 is a disk interface that is provided with channel protocol devices corresponding to ports (not shown in the drawing) and that performs control of I/O access to the disk device 41 connected to the ports via disk channels. More specifically, the disk adapter 425 retrieves data from the cache memory unit 424 and stores the data in the disk device 41 (destaging); or reads data from the disk device 41 and writes the data in the cache memory unit 424 (staging). For example, when the disk adapter 425 receives a read request from the host apparatus 3 and also when the required data does not exist in either the volatile cache memory 4241 or the non-volatile cache memory 4242, the disk adapter 425 conducts destaging as appropriate to reserve a cache area, and then subjects the required data to destaging to the volatile cache memory 4241.

The shared memory unit 426 includes shared memory modules 4261 that store various types of information each component in the storage apparatus should refer to; and a shared memory controller (SMC) for controlling the shared memory modules 4261. Each shared memory unit 4261 will be merely referred to as shared memory 4261. In this embodiment, the shared memory 4261 is composed of volatile memory such as DRAM. The shared memory 4261 stores various kinds of information such as system configuration information and cache memory management information, as shown in, e.g., FIG. 4. The shared memory 4261 also stores the currently stored dirty data amount in the volatile cache memory 4241.

The management apparatus 427 is a console for maintaining and managing the storage apparatus 4. For example, a general computer may be utilized as the management apparatus 427. A system administrator operates the management apparatus 427 interactively, and so is capable of defining a logical device in the disk device 41 or giving the storage apparatus 4 an instruction regarding expansion or reduction of the disk device 41, setting/change of a RAID configuration, etc. As described later, a system administrator also operates the management apparatus 427 interactively, and so is capable of issuing an instruction regarding setting/change/release, etc. of a cache-resident area. In this example, the management apparatus 427 is configured as an internal component for the disk controller 42, but may be configured as a separate component from the disk controller 42.

Each internal switch 428 is a switching device composed of crossbar switches or similar. The internal switch 428 arbitrates competition of data signals input, and conducts path switching for the data signals, thereby establishing a path between a sending source module and a sending destination module. The internal switch 428 may be a packet-exchange method switching device.

The power supply unit 43 supplies power to the disk device 41 and the disk controller 42 under the control of a power supply controller (not shown in the drawing). The power supply unit 43 includes a secondary power supply unit composed of a battery. The power supply controller is provided with a power shutdown detection unit that monitors abnormal variation of supplied power. When detecting a rapid decrease of the supplied power, the power supply shutdown detection unit determines that a power shutdown has occurred, switches the present power supply to the power supply from the secondary power supply unit, and generates an abnormal interrupt to the microprocessor 421.

Figure 4:
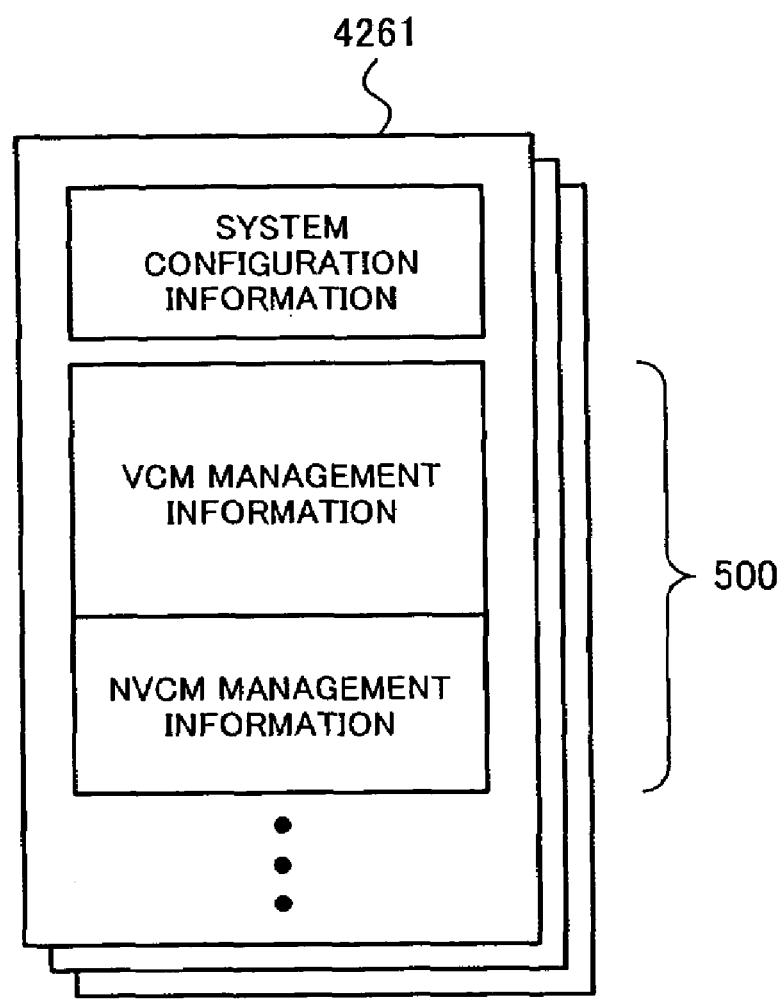
FIG. 4 is a diagram showing the content of shared memory in a storage apparatus in accordance with an embodiment of the invention.

FIG. 4 is a diagram showing the content of the shared memory 4261 in the storage apparatus 4 in accordance with the embodiment of the invention. As described above, the shared memory 4261 stores the system configuration information and the cache management information. The diagram shows the system configuration information and the cache management information including volatile cache memory management information and non-volatile cache memory management information.

The system configuration information is information about the system configuration that includes configuration information about each component in the storage apparatus 4; and version information about a control program that operates on each component.

The cache management information is meta-information for managing the data cached in the cache memory. More specifically, the cache management information is information for conducting management concerning in which storage area (logical block) in the disk device 41 each data cached in the cache memory is stored and whether or not the data is in a dirty status. The channel adapter 423 judges whether or not data according to an I/O access request exists in any cache memory by referring to the cache management information. Also, the disk adapter 425 refers to the cache management information to be capable of subjecting the data cached in the cache memory unit 424 to destaging to a specified storage area in the disk device 41.

The cache management information for a unit manages a data block with a predetermined size. Therefore, large-size data is managed by the cache management information for plural units. The cache management information is implemented as a cache management table having a table structure. In this embodiment, the cache management information is composed of management information for the volatile cache memory 4241 (hereinafter referred to as "volatile cache memory management information") and management information for the non-volatile cache memory 4242 (hereinafter referred to as "non-volatile cache memory management information").

FIG. 5 is a diagram showing an example of a cache management table 500 stored in the shared memory 4261 in the storage apparatus 4 in accordance with the embodiment of the invention. As shown in FIG. 5, the cache management table includes, for each entry, a start logical address column 501, a cache memory start address column 502, and a dirty status column 503.

The start logical address column 501 indicates a start address for a block that stores data in a logical device. The cache memory start address column 502 indicates an address for a block that stores the relevant data in the cache memory (i.e., the volatile cache memory 4241 or the non-volatile cache memory 4242). By way of assigning a unique address value to each of the volatile cache memory 4241 and the non-volatile cache memory 4242, a judgment can be made as to whether the data write destination is the volatile cache memory 4241 or the non-volatile cache memory 4242 based on the address value. The dirty status (dirty bit) column 503 shows whether or not the relevant data is dirty data. In this example, "0" stored in the dirty status column 503 indicates clean data, while "1" indicates dirty data.

FIG. 6 is a diagram showing an example of an internal table 600 held in the local memory 422 in the storage apparatus 4 in accordance with the embodiment of the invention. As shown in FIG. 6, the internal table 600, for each entry, includes a cache memory number column 601, a cache-resident setting status column 602, a dirty data amount threshold value column 603, a cache-resident area leading address column 604, a cache-resident area ending address column 605, and a cache-resident area size column 606.

The cache memory number column 601 indicates a cache memory number for identifying cache memories provided in the storage apparatus 4. In this example, VCMs #0-3 are shown as the volatile cache memories 4241, and NVCMs #0-3 are shown as the non-volatile cache memories 4242.

The cache-resident setting status column 602 indicates whether or not a cache-resident area is set in cache memory. The cache-resident area may be set in either the volatile cache memory 4241 or the non-volatile cache memory 4242. However, in this embodiment, the cache-resident area is set for the non-volatile cache memory 4242. In this example, the cache-resident areas are set in NVCMs #0-2, and the cache-resident area is not set in NVCM #3. The dirty data amount threshold value column 603 shows the upper limit of the amount of dirty data cacheable in cache memory. The dirty data amount threshold value may be set for either the volatile cache memory 4241 or the non-volatile cache memory 4242. However, in this embodiment, the dirty data amount threshold value is set for each volatile cache memory 4241.

The cache-resident area start address column 604 indicates a start address for the set cache-resident area, and the cache-resident area end address column 605 indicates an end address for the area. The cache-resident area size column 606 indicates the size of the set cache-resident area, and the size is calculated based on the start address and end address for the cache-resident area.

Figure 7:
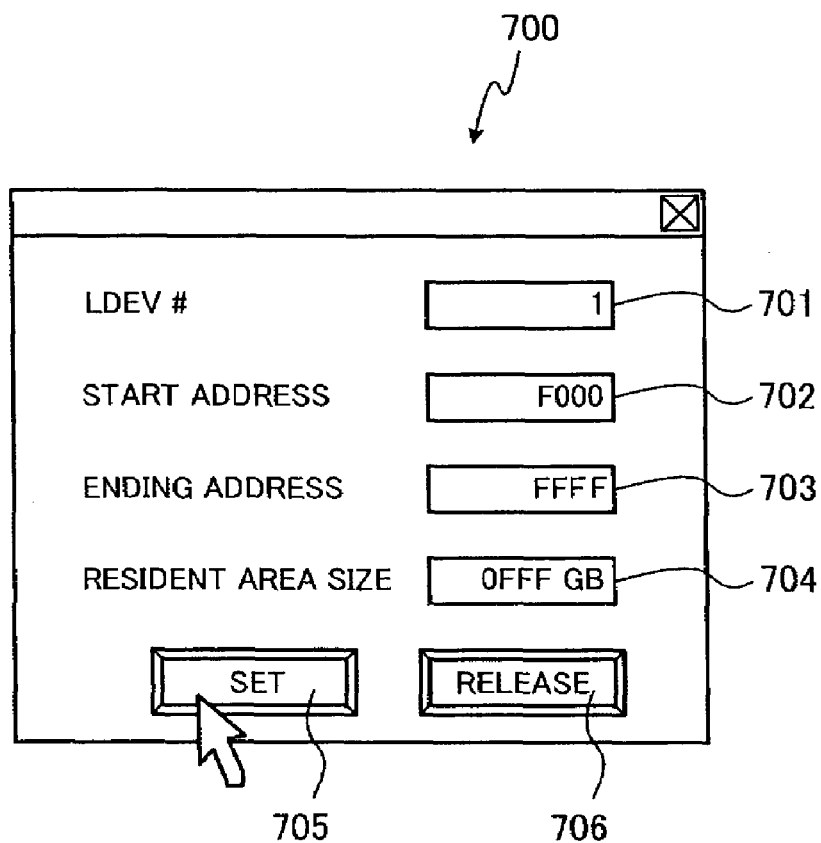
FIG. 7 is a diagram showing a setting window for a cache-resident area for a storage apparatus in accordance with an embodiment of the invention.

FIG. 7 is a diagram showing a setting window for a cache-resident area for the storage apparatus 4 in accordance with the embodiment of the invention.

A system administrator conducts setting of a cache-resident area via a setting window 700 for the cache-resident area that is displayed on a screen of the management apparatus 427. Specifically, the system administrator inputs a logical device number (LDEV#) 701, a start address 702, and an end address 703 in the setting window for the cache-resident area. Also, the end address 703 can be automatically calculated by inputting a cache-resident area size 704 instead of the ending address 703. Upon receiving an instruction regarding setting (or release) of the cache-resident area from a system administrator, the management apparatus 427 sends a cache-resident area setting command to the microprocessor 421 in the disk controller 42. In response to this, the microprocessor 421 updates the content of the internal table 600 in the local memory 422.

Figure 8:
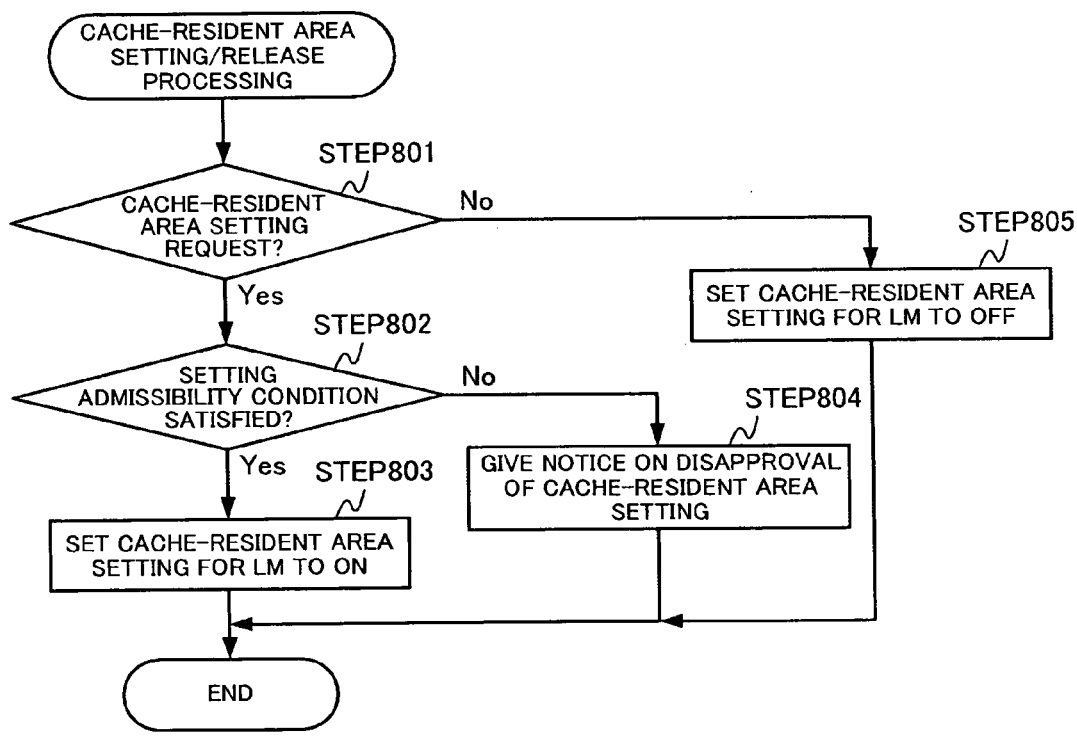
FIG. 8 is a flowchart explaining setting/release processing for a cache-resident area in a storage apparatus in accordance with an embodiment of the invention.

FIG. 8 is a flowchart explaining setting/release processing for a cache-resident area in the storage apparatus 4 in accordance with the embodiment of the invention.

Referring to FIG. 8, the microprocessor 421 receives a setting command for a cache-resident area, and interprets the command (STEP 801). If the microprocessor 421 determines that the setting command involves a cache-resident area setting request (Yes at STEP 801), the microprocessor 421 judges whether or not a predetermined setting permissibility condition is satisfied (STEP 802). The predetermined setting permissibility condition means that a dirty data amount threshold value is smaller than the value obtained by subtracting the required cache-resident area size from the capacity of the non-volatile cache memory 4242. In other words, the cache-resident area being set so that the dirty data amount is smaller than the size of the area (used as a backup area) other than the cache-resident area in the non-volatile cache memory 4242 is guaranteed. If the microprocessor 421 determines that the predetermined setting permissibility condition is satisfied (Yes at STEP 802), the microprocessor 421 sets the cache-resident setting status in the relevant entry in the internal table in the local memory 422 to ON (i.e., "1") (STEP 803).

In contrast, if the microprocessor 421 determines that the predetermined setting permissibility condition is not satisfied (No at STEP 802), the microprocessor 421 gives notice on the disapproval of setting of the required cache-resident area (STEP 804).

Also, if the microprocessor 421 determines that the setting command involves a cache-resident area release request at STEP 801 (No at STEP 801), the microprocessor 421 sets the setting of the resident-cache area for the relevant entry in the internal table in the local memory 422 to OFF (i.e., "0") (STEP 805).

As described above, the storage apparatus 4 sets the cache-resident area in the non-volatile cache memory 4242 under the control of the microprocessor 421. After the cache-resident area is set, the storage apparatus 4 subjects the corresponding data in the logical device to staging to the cache-resident area in the non-volatile cache memory 4242, and prepares for an access request from the host apparatus 3.

Figure 9:
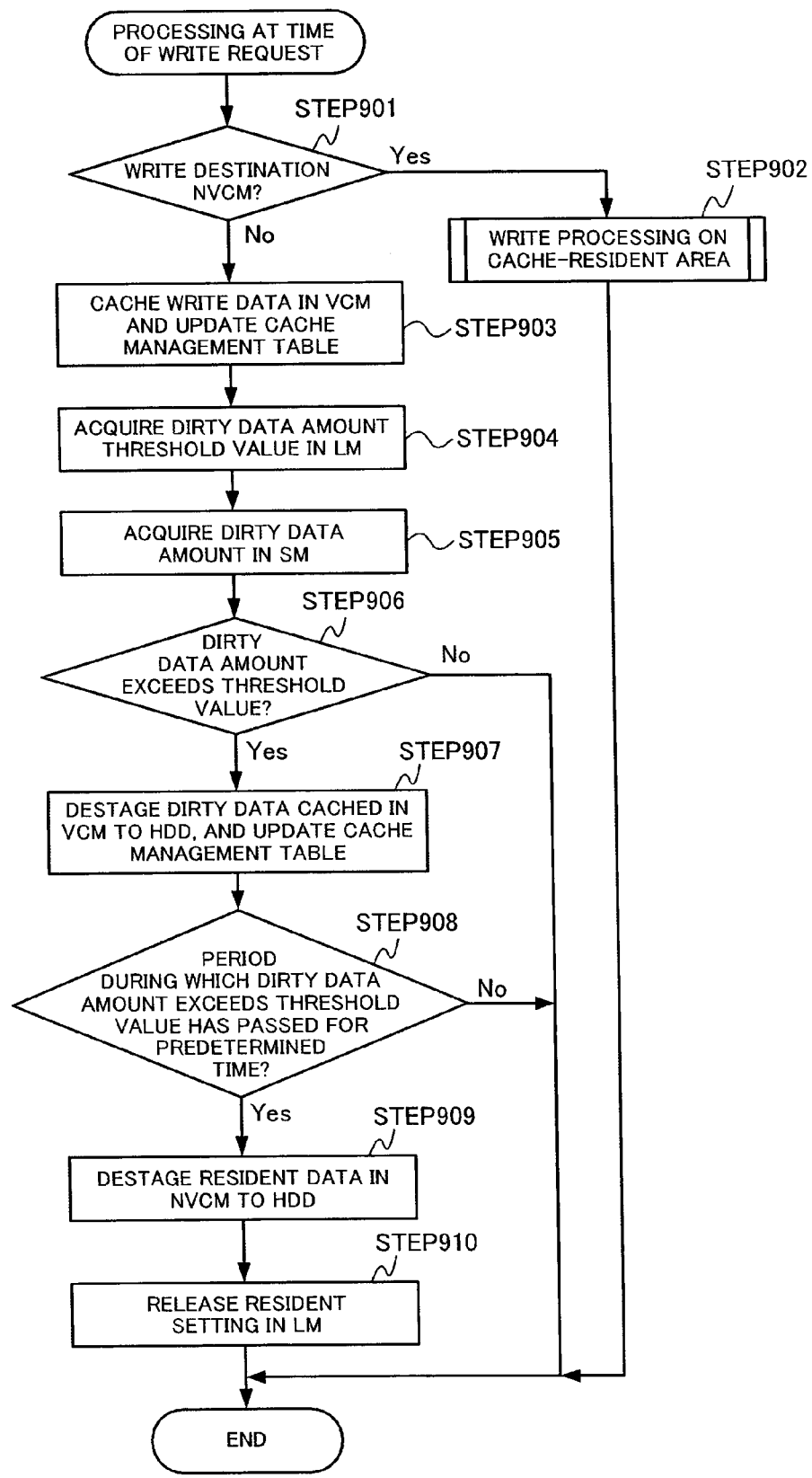
FIG. 9 is a flowchart explaining I/O processing in a storage apparatus in accordance with an embodiment of the invention.

FIG. 9 is a flowchart explaining I/O processing in the storage apparatus 4 in accordance with the embodiment of the invention. Specifically, FIG. 9 is a flowchart explaining write processing when a write request from the host apparatus 3 is received.

More specifically, as shown in FIG. 9, upon receiving a write request from the host apparatus 3 via the channel adapter 423, the microprocessor 421 refers to the local memory 422 and judges whether or not the data write destination specified by the write request is the cache-resident area in the non-volatile cache memory 4242 (STEP 901). If the microprocessor 421 determines that the write destination is the cache-resident area in the non-volatile cache memory 4242 (Yes at STEP 901), the microprocessor 421 executes write processing on the non-volatile cache memory 4242 (STEP 902). Write processing on the non-volatile cache memory 4242 will be described later with reference to FIG. 10.

In contrast, if the microprocessor 421 determines that the write destination is not the cache-resident area in the non-volatile cache memory 4242 (No at STEP 901), the microprocessor 421 caches the data in response to the write request (write data) in the volatile cache memory 4241, and updates the entry corresponding to the write data in the cache management table 500 in the shared memory 4261 (STEP 903). At this point, the data attribute (dirty status) for the relevant entry in the cache management table 500 in the shared memory 4261 is set to "dirty" (i.e., "1").

The microprocessor 421 next refers to the internal table 600 in the local memory 422 to acquire a dirty data amount threshold value (STEP 904), and refers to the shared memory 4261 to acquire the current dirty data amount (STEP 905). Subsequently, the microprocessor 421 compares the dirty data amount threshold value with the current dirty data amount, and judges whether or not the current dirty data amount exceeds the dirty data amount threshold value (STEP 906).

If the microprocessor 421 determines that the current dirty data amount does not exceed the dirty data amount threshold value (No at STEP 906), the microprocessor 421 terminates this write processing. In contrast, if the microprocessor 421 determines that the current dirty data amount exceeds the dirty data amount threshold value (Yes at STEP 906), the microprocessor 421 destages the data, which has been cached in the volatile cache memory 4241, to the corresponding area in the disk device 41, and sets the attribute for the data to "clean" (i.e., "0") (STEP 907). At this point, the microprocessor 421 starts timing of the period during which the dirty data amount exceeds the threshold value.

After that, the microprocessor 421 judges whether or not the period during which the current dirty data amount exceeds the dirty data amount threshold value has passed a predetermined time (STEP 908). If the microprocessor 421 determines that the period during which the current dirty data amount exceeds the dirty data amount threshold value has not passed a predetermined time (No at STEP 908), the microprocessor 421 terminates write processing in response to the write request. Meanwhile, if the microprocessor 421 determines that the period during which the current dirty data amount exceeds the dirty data amount threshold value has passed a predetermined time (Yes at STEP 908), the microprocessor 421 destages the data resident in the cache-resident area in the non-volatile cache memory 4242 to the disk device 41 (STEP 909). Therefore, the state in which the dirty data amount exceeds the backup area size can be prevented. Then, the microprocessor 421 sets the cache-resident area setting for the data in the internal table 600 in the local memory 422 to OFF (STEP 910).

Figure 10:
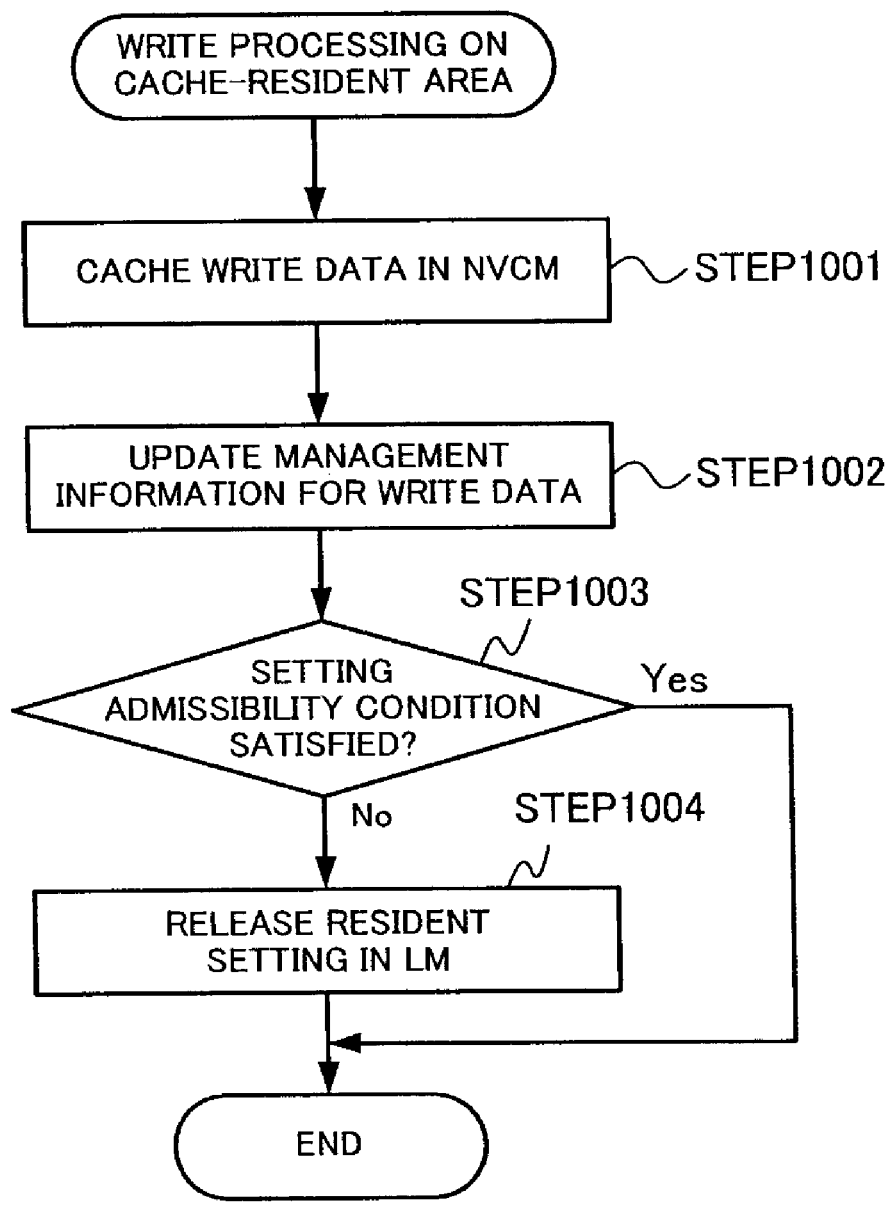
FIG. 10 is a flowchart explaining I/O processing in a storage apparatus in accordance with an embodiment of the invention.

FIG. 10 is a flowchart explaining I/O processing in the storage apparatus 4 in accordance with the embodiment of the invention. Specifically, FIG. 10 is a flowchart explaining write processing on the cache-resident area that is executed at STEP 902.

More specifically, the microprocessor 421 refers to the internal table 600 in the local memory 422, and if the microprocessor 421 determines that the data write destination specified by the write request is the cache-resident area in the non-volatile cache memory 4242, the microprocessor 421 caches the data in response to the write request in the cache-resident area in the non-volatile cache memory 4242 (STEP 1001). The microprocessor 421 then updates the entry for the write data in the cache management table 500 in the shared memory 4261 (STEP 1002).

The microprocessor 421 next judges whether or not a predetermined setting permissibility condition is satisfied (STEP 1003). As described above, the predetermined setting permissibility condition means that a dirty data amount threshold value is smaller than the value obtained by subtracting the required cache-resident area size from the capacity of the non-volatile cache memory 4242. If the microprocessor 421 determines that the predetermined setting permissibility condition is satisfied (Yes at STEP 1003), the microprocessor 421 terminates this processing. In contrast, if the microprocessor 421 determines that the predetermined setting permissibility condition is not satisfied (No at STEP 1003), the microprocessor 421 sets the cache-resident setting for the relevant entry in the internal table 600 in the local memory 422 to OFF (STEP 1004).

As described above, upon receiving the write request from the host apparatus 3, the storage apparatus 4 in this embodiment caches the write data in the volatile cache memory 4241 or the non-volatile cache memory 4242 in accordance with the specified write destination. At this point, when the predetermined setting permissibility condition is not satisfied, the microprocessor 421 releases the cache-resident area to have the area serve as a backup area. Accordingly, even when an emergency backup request due to an unexpected power shutdown or similar occurs, the dirty data cached in the volatile cache memory 4241 can be reliably backed up to the backup area in the non-volatile cache memory 4242.

Figure 11:
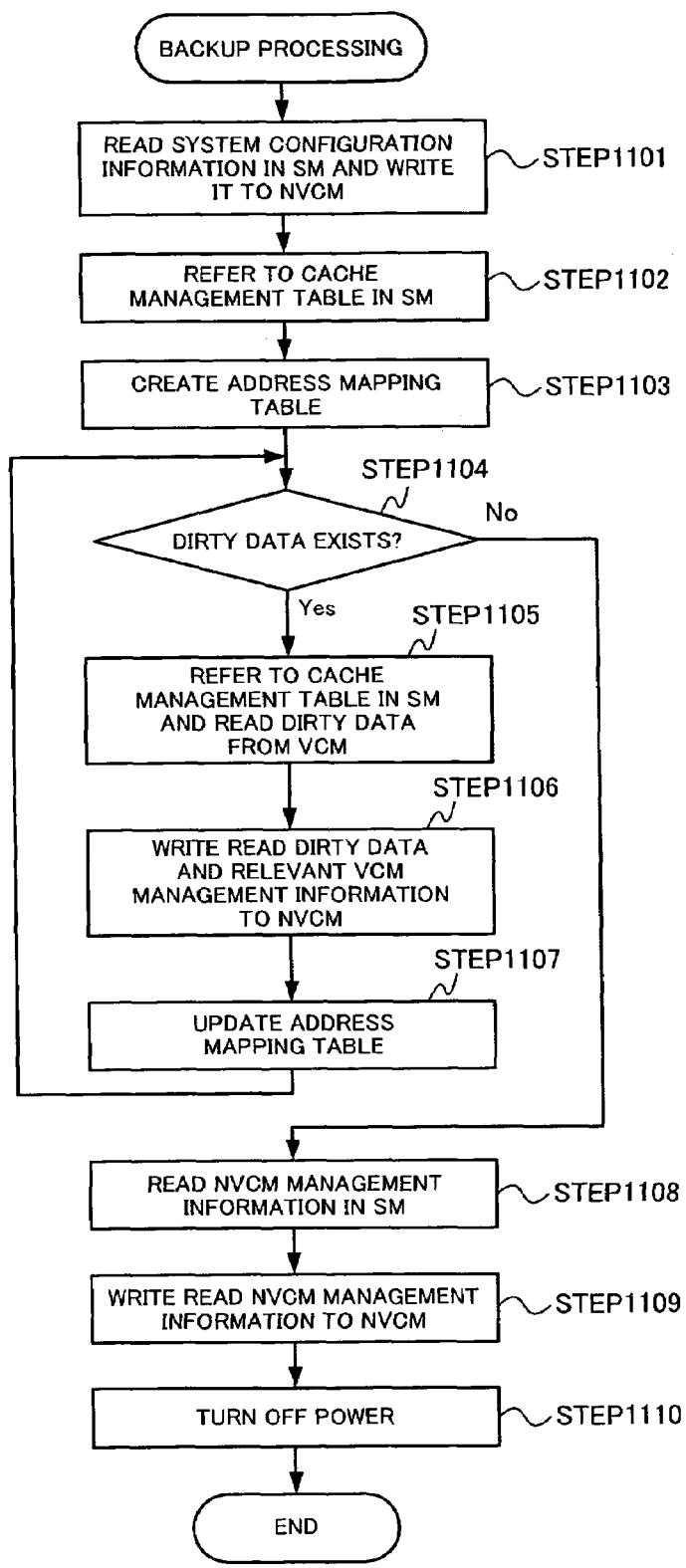
FIG. 11 is a flowchart explaining backup processing in a storage apparatus in accordance with an embodiment of the invention.

FIG. 11 is a flowchart explaining backup processing in the storage apparatus 4 in accordance with the embodiment of the invention. Backup processing is executed by the cache memory controller 4243 that has received an instruction from the microprocessor 421. For example, upon receiving a notice of a power shutdown from the power shutdown detection unit in the power supply unit 43, the microprocessor 421 issues a backup request to the cache memory controller 4243.

More specifically, when an emergency backup request due to an unexpected power shutdown or similar occurs, the cache memory controller 4243 first reads the system configuration information in the shared memory 4261, and writes the information to the backup area in the non-volatile cache memory 4242 (STEP 1101). The system configuration information is defined as information to be stored at a specific position (e.g., number 0) in the shared memory 4261 and to be backed up at a specific position (similarly, e.g., number 0) in the non-volatile cache memory 4242.

Next, the cache memory controller 4243 refers to the cache management table 500 in the shared memory 4261 (STEP 1102), and creates an address mapping table in the non-volatile cache memory 4242 (STEP 1103). FIG. 12 is a diagram showing an example of the address mapping table in the storage apparatus 4 in accordance with the embodiment of the invention. The address mapping table is one in which the dirty data in the volatile cache memory 4241 is associated with the position where the dirty data is backed up to the non-volatile cache memory 4242. The cache memory controller 4243 refers to the address mapping table in restoration processing, and writes the backup data back to the original position in the volatile cache memory 4241.

Returning to FIG. 11, the cache memory controller 4243 next refers to the cache management table 500, and judges whether or not dirty data exists in the volatile cache memory 4241 (STEP 1104). If the cache memory controller 4243 determines that dirty data exists in the volatile cache memory 4241 (Yes at STEP 1104), the cache memory controller 4243 refers to the cache management table 500 in the shared memory 4261, and reads the dirty data from the volatile cache memory 4241 (STEP 1105). The cache memory controller 4243 then writes the dirty data it has read and the relevant cache management information in the cache management table 500 (i.e., volatile cache memory management information) in the non-volatile cache memory 4242 (STEP 1106), and updates the relevant entry in the address mapping table (STEP 1107). The cache memory control 4243 repeats the above processing until the transfer of all the dirty data in the volatile cache memory 4241 and the relevant volatile cache memory management information to the non-volatile cache memory 4242 is finished.

Upon the completion of the transfer of all the dirty data in the volatile cache memory 4241 and the relevant volatile cache memory management information (No at STEP 1104), the cache memory controller 4243 reads the non-volatile cache memory management information from the shared memory 4261 (STEP 1108), and writes the data to the non-volatile cache memory 4242 (STEP 1109).

Then, the cache memory controller 4243 notifies the microprocessor 421 of the completion of the transfer of the data to be subjected to backup, and in response to this, the microprocessor 421 executes processing concerning a power shutdown from the secondary power supply (STEP 1110), and terminates the entire backup processing.

Figure 13:
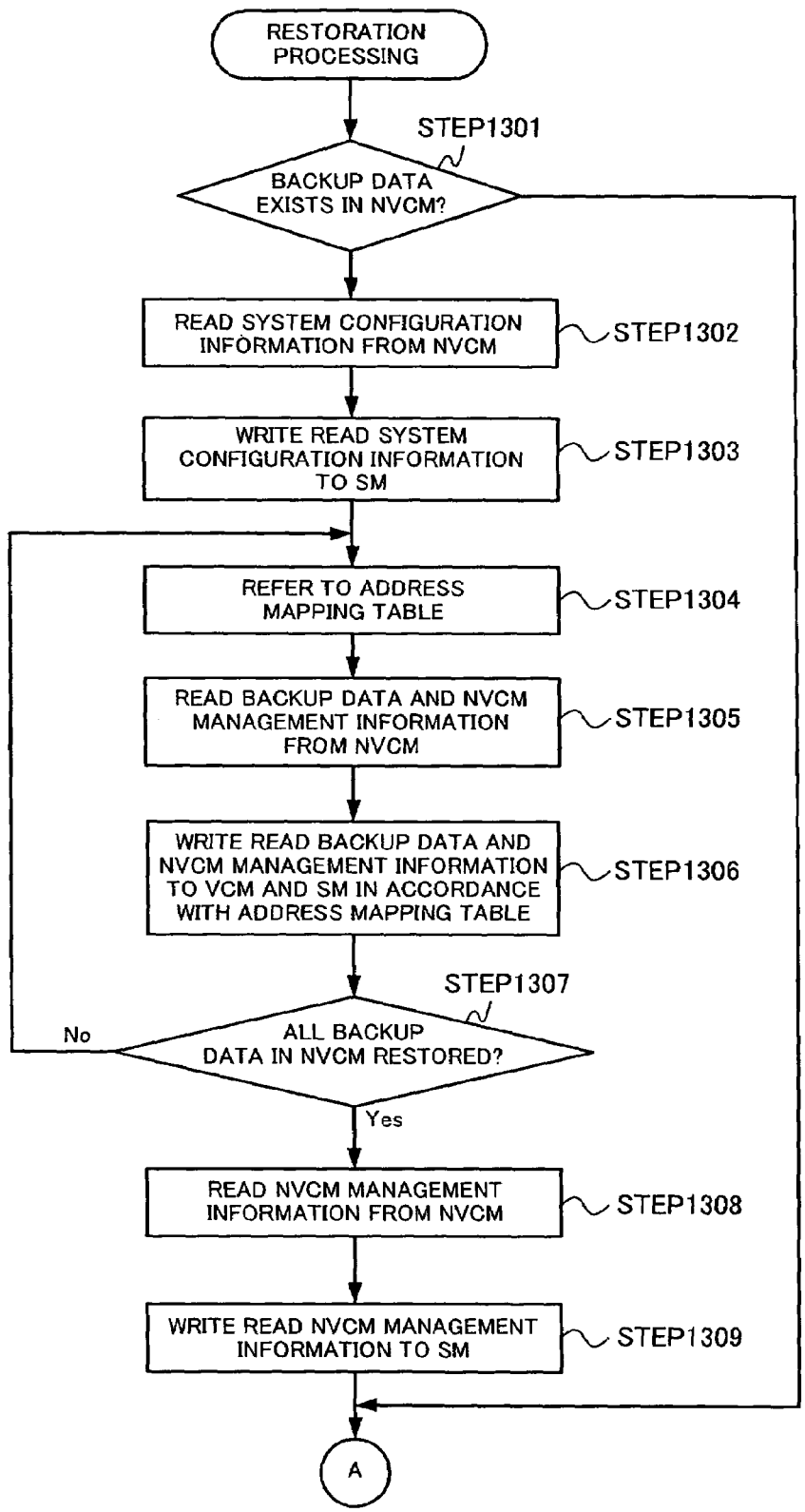
FIG. 13 is a flowchart explaining restoration processing in a storage apparatus in accordance with an embodiment of the invention.
Figure 14:
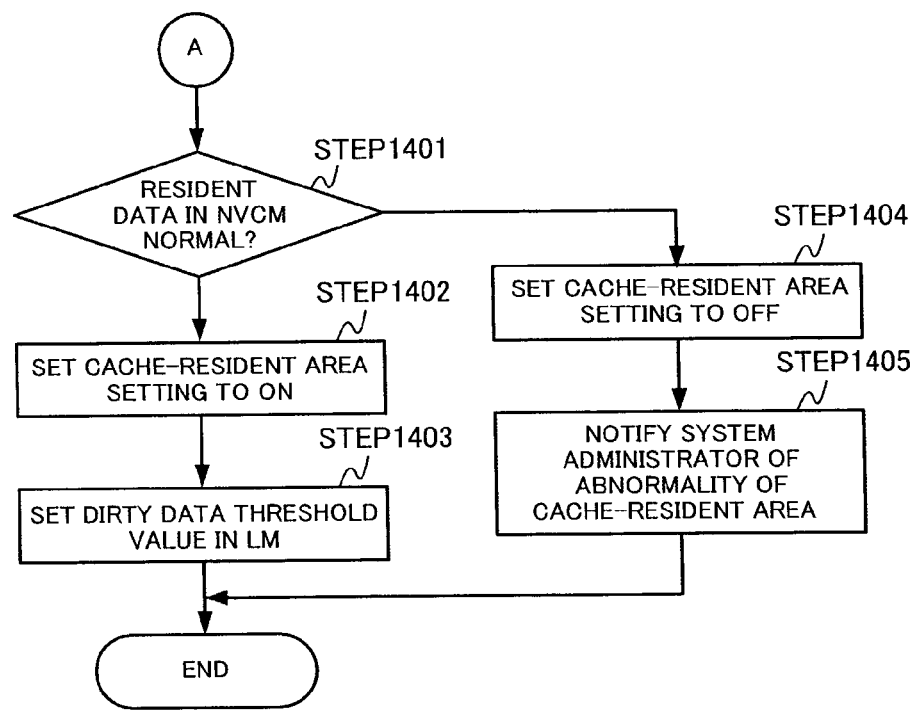
FIG. 14 is a flowchart explaining restoration processing in a storage apparatus in accordance with an embodiment of the invention.

FIGS. 13 and 14 each are a flowchart explaining restoration processing in the storage apparatus 4 in accordance with the embodiment of the invention. Restoration processing is executed by the cache memory controller 4243 that has received an instruction from the microprocessor 421 when power is restored after the execution of backup processing described above.

Referring to FIG. 13, the cache memory controller 4243 judges whether or not backup data exists in the non-volatile cache memory 4242 (STEP 1301). If the cache memory controller 4243 determines that backup data exists in the non-volatile cache memory 4242 (Yes at STEP 1301), the cache memory controller 4243 reads the system configuration information in the non-volatile cache memory 4242 (STEP 1302), and writes the information at the original position in the volatile cache memory 4241 (STEP 1303).

The cache memory controller 4243 next refers to the address mapping table (STEP 1304), and reads the backup data and the relevant cache management information (i.e., non-volatile cache memory management information) (STEP 1305). Then, the cache memory controller 4243 writes the backup data and the relevant non-volatile cache management information it has read at the respective original positions in the volatile cache memory 4241 and the shared memory 4261 in accordance with the address mapping table (STEP 1306). The cache memory controller 4243 judges whether or not all the backup data in the non-volatile cache memory 4242 has been restored (STEP 1307). The cache memory controller 4243 repeats the above processing until restoration for all the backup data is completed.

When the cache memory controller 4243 completes the restoration for all the backup data (Yes at STEP 1307), the cache memory controller 4243 reads the non-volatile cache memory management information (STEP 1308), and writes the information at the original position in the shared memory 4261 (STEP 1309).

As described above, both the data backed up to the non-volatile cache memory 4242 and the relevant cache management information are restored to their respective original positions in the volatile cache memory 4241 and the shared memory 4261.

Subsequently, the cache memory controller 4243 judges whether or not the data in the cache-resident area in the non-volatile cache memory 4242 is normal (STEP 1401 in FIG. 14). If the cache memory controller 4243 determines that the data in the cache-resident area is normal (Yes at STEP 1401), the cache memory controller 4243 makes a request to the microprocessor 421 to make the cache-resident area for each entry in the internal table 600 in the local memory 422 valid. In response to the request, the microprocessor 421 sets the setting of the cache-resident area for each entry in the internal table 600 to ON (STEP 1402). Then, the microprocessor 421 sets a dirty data amount threshold value in the internal table 600 in the local memory 422 (STEP 1403).

If the cache memory controller 4243 determines that the data in the cache-resident area is not normal (No at STEP 1401), the cache memory controller 4243 requests the microprocessor 421 to make the cache-resident invalid. In response to the request, the microprocessor 421 sets the setting of the cache-resident area for each entry in the internal table 600 to OFF (STEP 1404). Then, the microprocessor 421 notifies the management apparatus 427 of abnormality in the cache-resident area (STEP 1405). Accordingly, a system administrator can recognize the abnormality in the cache-resident area.

Figure 15:
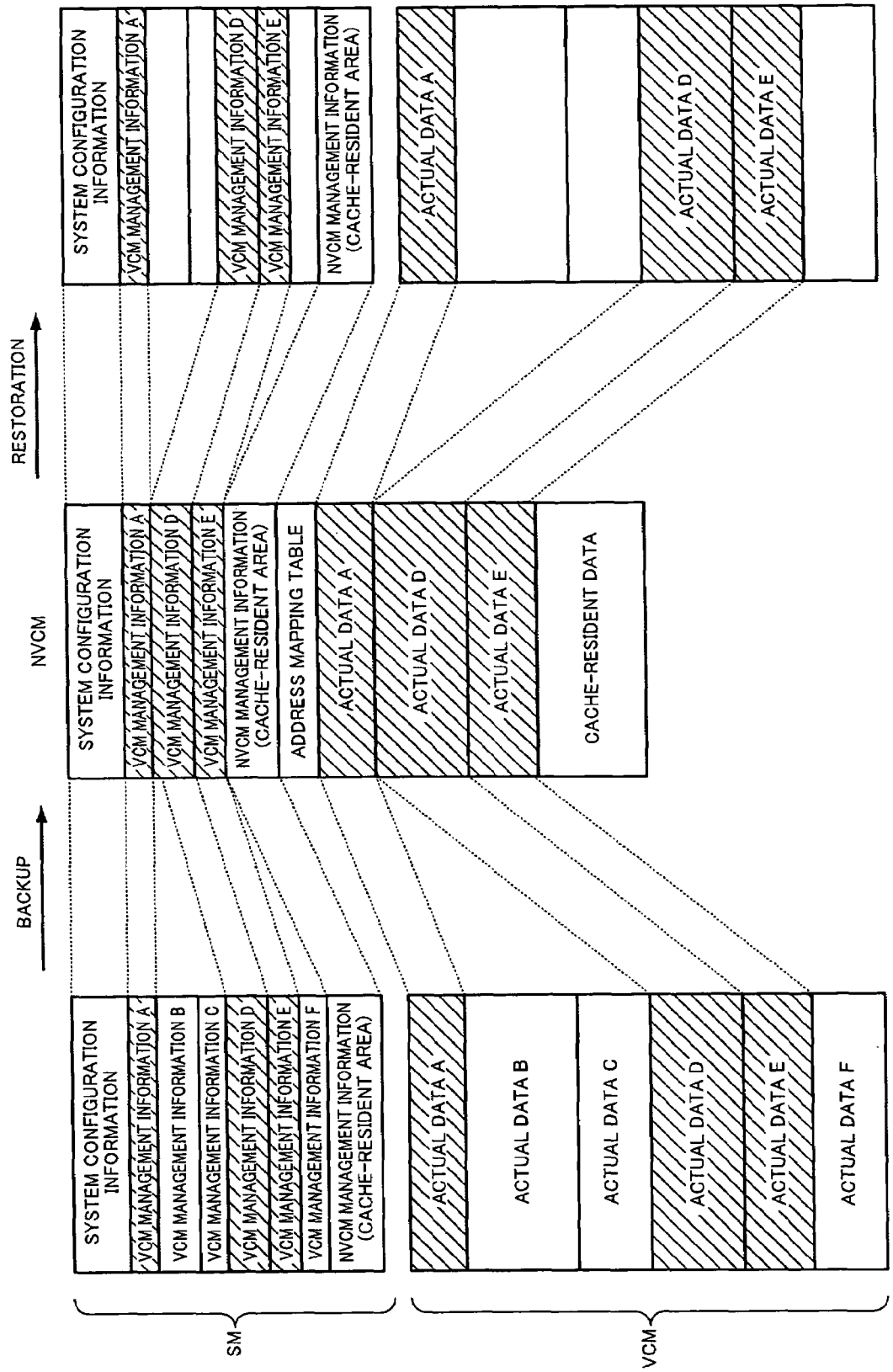
FIG. 15 is a diagram schematically explaining cache memory in backup/restoration processing in a storage apparatus in accordance with an embodiment of the invention.

FIG. 15 is a diagram schematically explaining cache memory in backup/restoration processing in the storage apparatus 4 in accordance with the embodiment of the invention.

More specifically, the volatile cache memory 4241 and the shared memory 4261 are assumed to be in their respective usage statuses, as shown in the left part of FIG. 15. In other words, assume that actual data (application data) A to F have been cached in the volatile cache memory 4241. Here, actual data A, D, and E shown by hatching are in a dirty status, while actual data B, C, and F are in a clean status. The shared memory 4261 stores the system configuration information, and volatile cache memory management information A to F corresponding to actual data A to F cached in the volatile cache memory 4241. The shared memory 4261 also stores the non-volatile cache memory management information.

In this situation, when an emergency backup request due to an unexpected power shutdown or similar occurs, the cache memory controller 4243 backs up the system configuration information to the non-volatile cache memory 4242, and also creates the address mapping table in the non-volatile cache memory 4242, as described above. The cache memory controller 4243 also backs up actual data A, D, and E, which are dirty data, and the corresponding volatile cache memory management information A, D, and E to the non-volatile cache memory 4242. Moreover, the cache memory controller 4243 backs up the non-volatile cache memory management information in the shared memory 4261 to the non-volatile cache memory 4242. The center part of FIG. 15 shows the content of the non-volatile cache memory 4242 at this point.

During restoration, the cache memory controller 4243 writes the backed up system configuration information back to the shared memory 4261. The cache memory controller 4243 also writes backed-up actual data A, D, and E back to the volatile cache memory 4241, and writes relevant volatile cache memory management information A, D, and E back to the shared memory 4261, in accordance with the address mapping table. Moreover, the cache memory controller 4243 writes the non-volatile cache memory management information back to the shared memory 4261. The right part of FIG. 15 shows the respective content of the volatile cache memory 4241 and the shared memory 4261 after restoration.

As apparent from FIG. 15, actual data B, C, and F, which are clean data, have been destaged when a backup request occurs, and so are not backed up to the non-volatile cache memory 4242. Therefore, in this embodiment, only the dirty data in the volatile cache memory 4241 is subjected to backup, which can enhance the efficiency of backup processing.

Figure 16:
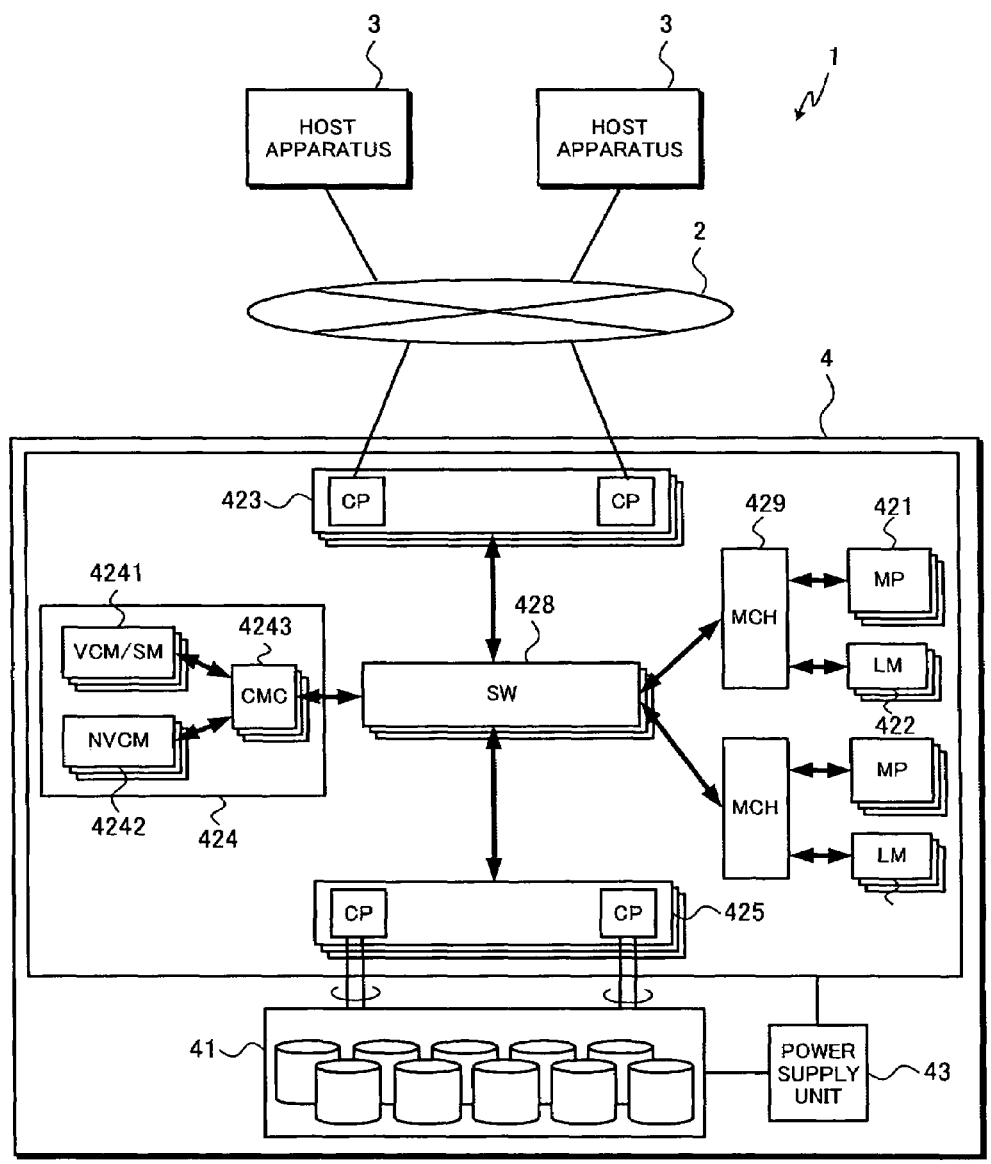
FIG. 16 is a diagram showing a configuration for a storage apparatus in accordance with another embodiment of the invention.

FIG. 16 is a diagram showing a configuration for a storage apparatus 4 in accordance with another embodiment of the invention. The storage apparatus 4 in this embodiment has a configuration in which plural microprocessors 421 are connected to internal switches 428 via microprocessor channels (MCH) 429. The microprocessors 421 share a group of local memories 422 connected to the same microprocessor channel 429. Also, in this embodiment, a part of a volatile cache memory 4241 is used as shared memory. In other words, the volatile cache memory 4241 stores system configuration information, cache management information, etc. Even when a part of the volatile cache memory 4241 is utilized as shared memory instead of providing separate shared memory, backup/restoration processing described above can be executed. Note that a management apparatus is omitted for simplification in this diagram.

Figure 17:
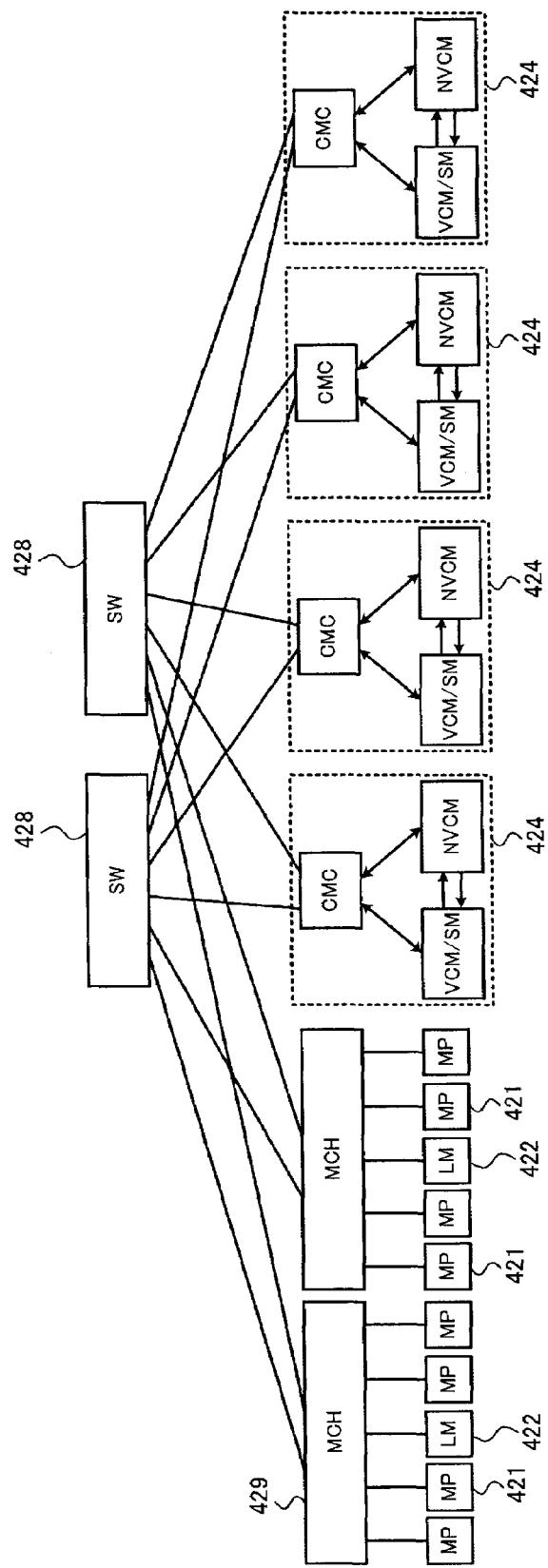
FIG. 17 is a diagram explaining the connection relationship between microprocessors and cache memories in the storage apparatus shown in FIG. 16.

FIG. 17 is a diagram explaining the connection relationship between the microprocessors 421 and cache memory units 424 in the storage apparatus 4 in accordance with this embodiment of the invention. In this example, the duplicated internal switches 428 each are connected to two microprocessor channels 429 and four cache memory units 424, and the two microprocessor channels each are connected to four microprocessors 421 and the local memory 422 shared by the microprocessors 421. Each cache memory unit 424 includes volatile cache memory 4241, non-volatile cache memory 4242, and a cache memory controller 4243.

In the storage apparatus 4 configured as above, cache-resident areas are discretely set in the respective non-volatile cache memories 4242. The microprocessors 421 can access in parallel the cache-resident areas by referring to the local memories 422. Therefore, even if flash memory with a relatively slow write access rate is used as the non-volatile cache memory 4242, the reduced rate due to parallel access can be absorbed.

The above embodiment are merely examples used to explain the invention, and the invention is not limited to those embodiments. The invention can be implemented in various forms, to extent that they do not depart from the scope of the gist of the invention. For example, processing in the storage apparatus has been described as being configured in a sequential-step manner, but the invention does not have to adhere to this configuration. Accordingly, operation or processing steps may be interchanged or arranged parallel, so long as the result of the operation or processing remains consistent.

The invention can be utilized in a wide variety of storage apparatuses provided with cache memories.

What is claimed is:

1. A storage apparatus comprising:
a disk device with plural logical volumes for storing a plurality of datasets; and
a disk controller configured to control the disk device,
wherein the disk controller comprises:
a host interface configured to receive an access request from a host apparatus;
a disk interface connected to the disk device; and
a cache memory unit connected to the host interface and the disk interface and including a volatile cache memory and a non-volatile cache memory, the non-volatile cache memory including a cache-resident area and a backup area, wherein the disk controller has a first dataset stored in a first logical volume in the disk device resident in the cache-resident area formed in the non-volatile cache memory, wherein the host interface, for each receipt of a write request from the host apparatus, writes a second dataset according to the write request to a predetermined area in the volatile cache memory, and sets a dirty attribute in cache management information for the written second dataset to on, wherein, when the disk interface destages the second dataset written to the predetermined area in the volatile cache memory to a second logical volume in the disk device, the disk interface sets the dirty attribute in the cache management information for the destaged second dataset to off, and wherein the disk controller, at the time of a power shutdown, transfers, using a battery as a secondary power supply, the second data set for which the dirty attribute is on, from among a group of the second datasets that have been written to the volatile cache memory, to the backup area in the non-volatile cache memory, when writing the second dataset according to the write request to the volatile cache memory wherein, before the power shutdown, the disk controller configured to:

acquire a size of the area in the volatile cache memory used by the group of the already-written second datasets for each of which the dirty attribute is on;

judge whether the acquired area size exceeds a predetermined threshold value; and destage the first dataset written to the cache-resident area to the first logical volume and use the cache-resident area of the first dataset as the backup area if the disk controller determines that the acquired area size exceeds the predetermined threshold value.

2. The storage apparatus according to claim 1, wherein the disk controller writes the transferred second dataset to an area other than the cache-resident area in the non-volatile cache memory.

3. The storage apparatus according to claim 2, wherein, when writing the second dataset according to the write request to the volatile cache memory, the disk controller acquires a size of the area used by the group of the already-written second datasets for each of which the dirty attribute is on, judges whether the acquired area size exceeds a predetermined threshold value, and destages dirty data cached in volatile cache in the disk device if the disk controller determines that the acquired area size exceeds the predetermined threshold value.

4. The storage apparatus according to claim 3, wherein the disk controller times a period during which the acquired area size exceeds the predetermined threshold value if the disk controller determines that the acquired area size exceeds the predetermined value, judges whether the timed period has passed a predetermined period, and destages the first data set written to the cache-resident area to the first logical volume if the disk controller determines that the timed period has passed the predetermined period.

5. The storage apparatus according to claim 2, wherein the disk controller releases the cache-resident area in which the first dataset has been destaged and which is in the non-volatile cache memory.

6. The storage apparatus according to claim 2, wherein the disk controller further includes a shared memory that stores first cache management information for the first data set and second cache management information for the second data set.

7. The storage apparatus according to claim 6, wherein the disk controller transfers the first cache management information and the second cache management information that are stored in the shared memory to the non-volatile cache memory at the time of the backup request.

8. The storage apparatus according to claim 2, wherein the disk controller stores the cache management information for the second data set in the volatile cache memory.

9. The storage apparatus according to claim 8, wherein the disk controller transfers the cache management information stored in the volatile cache memory to the non-volatile cache memory at the time of the backup request.

10. The storage apparatus according to claim 2, wherein the disk controller generates an address mapping table in which an address in the volatile cache memory, to which the second dataset for which the dirty attribute is on, is associated with an address for the non-volatile cache memory to which the second dataset, for which the dirty attribute is on, has been written.

11. The storage apparatus according to claim 10, wherein the disk controller writes the second dataset written to the non-volatile cache memory to the volatile cache memory in accordance with the created address mapping table at the time of a restoration request.

12. A method of backing up data in a storage apparatus including a disk device with plural logical volumes for storing a plurality of datasets and a disk controller configured to control the disk device, the method comprising:

having, under the control of the disk controller, a first dataset stored in a first logical volume in the disk device resident in a cache-resident area in non-volatile cache memory, the non-volatile cache memory including a cache-resident area and a backup area;

writing, under the control of the disk controller, for each receipt of a write request from a host apparatus, a second dataset according to the write request to a predetermined area in volatile cache memory and setting a dirty attribute for cache management information for the written second data set to on;

at the time the second dataset written to the predetermined area in the volatile cache memory is destaged to a second logical volume in the disk device, setting, under the control of the disk controller, the dirty attribute in the cache management information for the destaged second dataset to off; and at the time of a power shutdown, transferring, under the control of the disk controller, using a battery as a second power supply, the second dataset for which the dirty attribute is on, from among a group of the second datasets that have been written to the volatile cache memory, to the backup area in the non-volatile cache memory, when writing the second dataset according to the write request to the volatile cache memory wherein, before the power shutdown, the disk controller configured to:

acquire a size of the area in the volatile cache memory used by the group of the already-written second datasets for each of which the dirty attribute is on;

judge whether the acquired area size exceeds a predetermined threshold value; and destage the first dataset written to the cache-resident area to the first logical volume and use the cache-resident area of the first dataset as the backup area if the disk controller determines that the acquired area size exceeds the predetermined threshold value.

* * * * *